US012333312B2

United States Patent
Moshe et al.

(10) Patent No.: US 12,333,312 B2
(45) Date of Patent: Jun. 17, 2025

(54) DATA STORAGE WITH OPTIMIZED BOOT FILES LOADING

(71) Applicant: Western Digital Technologies, Inc., San Jose, CA (US)

(72) Inventors: Eran Moshe, Kfar Saba, IL (US); Gadi Vishne, Petach-Tikva (IL); Refael Ben-Rubi, Rosh Haayln (IL)

(73) Assignee: Sandisk Technologies, Inc., Milpitas, CA (US)

( * ) Notice: Subject to any disclaimer, the term of this patent is extended or adjusted under 35 U.S.C. 154(b) by 34 days.

(21) Appl. No.: 18/218,834

(22) Filed: Jul. 6, 2023

(65) Prior Publication Data

US 2024/0143337 A1 May 2, 2024

Related U.S. Application Data

(60) Provisional application No. 63/420,838, filed on Oct. 31, 2022.

(51) Int. Cl.
*G06F 9/4401* (2018.01)

(52) U.S. Cl.
CPC .................. *G06F 9/4401* (2013.01)

(58) Field of Classification Search
CPC .................................................. G06F 9/4401
See application file for complete search history.

(56) References Cited

U.S. PATENT DOCUMENTS

| | | | |
|---|---|---|---|
| 6,754,818 B1 | 6/2004 | Lee et al. | |
| 7,962,777 B2 | 6/2011 | Gonzalez et al. | |
| 9,940,039 B2 | 4/2018 | Duzly et al. | |
| 10,078,546 B2 | 9/2018 | Muchherla et al. | |
| 10,564,900 B2 | 2/2020 | Achtenberg et al. | |
| 10,936,481 B2* | 3/2021 | Kim | G06F 12/0246 |
| 2016/0117216 A1* | 4/2016 | Muchherla | G06F 11/30 714/6.11 |
| 2020/0043555 A1* | 2/2020 | Luo | G11C 16/10 |
| 2020/0073568 A1* | 3/2020 | Chaiken | G11C 29/021 |
| 2020/0142799 A1* | 5/2020 | Hiruta | G06F 11/3037 |
| 2021/0149564 A1* | 5/2021 | Luo | G06F 3/0616 |
| 2023/0315332 A1* | 10/2023 | Duval | G06F 3/0679 |

* cited by examiner

*Primary Examiner* — Nimesh G Patel (74) *Attorney, Agent, or Firm* — PATTERSON + SHERIDAN, LLP (57) ABSTRACT

A data storage device includes a memory device and a controller coupled to the memory device. When a boot operation of the data storage device is initiated, the controller retrieves a relevant boot file from the memory device to boot the data storage device with. The relevant boot file to be retrieved from a plurality of boot files may be determined by a write temperature corresponding to the temperature of when the boot file was programmed to the memory device and a read temperature of the boot file during the boot operation. Each boot file of the plurality of boot files is programmed using different programming parameters in order to cover a range of possible retention levels.

20 Claims, 5 Drawing Sheets

DATA STORAGE WITH OPTIMIZED BOOT FILES LOADING

CROSS-REFERENCE TO RELATED APPLICATIONS

This application claims benefit of U.S. Provisional Patent Application Ser. No. 63/420,838, filed Oct. 31, 2022, which is herein incorporated by reference.

BACKGROUND OF THE DISCLOSURE

Field of the Disclosure

Embodiments of the present disclosure generally relate to data storage devices, such as solid state drives (SSDs), and, more specifically, improving reliability of boot file data during boot operations.

Description of the Related Art

When computing devices, such as SSDs or servers, are booted up, relevant boot files are read from a memory device storing the boot files. The boot files include data and code that boots the computing devices and allows the computing devices to operate. When boot files are corrupted, the computing devices may not be able to boot up, which may cause a system failure. For example, if the boot files associated with the operating system are corrupted, then the operating system of the computing device may not load. Thus, corrupted boot files may have serious consequences in the operations of a computing device.

A solution for improving data retention may be to utilize error correction modules, such as low-density parity-check (LDPC) engines, that fix bit flips using additional data (e.g., parity data). However, error correction using LDPC may use methods such as soft bit error correction (e.g., 1 bit error correction or 2 bit error correction), bit error rate (BER) estimation scan (BES) (e.g., 3, 5, 7 points), exclusive or (XOR). However, the error correction utilizing LDPC may not be suitable for extreme temperature conditions. For example, when the computing device is in a high temperature condition, data retention may be decreased and LDPC error correction methods may not be able to correct bit flips. In other words, because the data of the boot files may be read at any temperature, which may be a different temperature than when the data of the boot files was programmed to the memory device, LDPC error correction methods for correcting bit flips may not be successful.

Therefore, there is a need in the art for improving data retention with respect to different operating temperatures of data storage devices.

SUMMARY OF THE DISCLOSURE

The present disclosure generally relates to data storage devices, such as solid state drives (SSDs), and, more specifically, improving reliability of boot file data during boot operations. A data storage device includes a memory device and a controller coupled to the memory device. When a boot operation of the data storage device is initiated, the controller retrieves a relevant boot file from the memory device to boot the data storage device with. The relevant boot file to be retrieved from a plurality of boot files may be determined by a write temperature corresponding to the temperature of when the boot file was programmed to the memory device and a read temperature of the boot file during the boot operation. Each boot file of the plurality of boot files is programmed using different programming parameters in order to cover a range of possible retention levels.

In one embodiment, a data storage device includes a memory device and a controller coupled to the memory device. The controller is configured to determine that a boot operation of the data storage device is occurring, retrieve a boot file from the memory device, and boot the data storage device using the retrieved boot filed. A plurality of boot files are stored in the memory device. Each of the plurality of boot files corresponds with a different data retention level. Retrieving the boot file includes determining a data retention level based on environment conditions of the memory device during the boot operation and selecting the boot file of the plurality of boot files based on the determining.

In another embodiment, a data storage device includes a memory device and a controller coupled to the memory device. The controller is configured to initiate a boot operation, determine a read temperature of a plurality of boot files, read metadata from the plurality of boot files, where the metadata includes a write temperature corresponding to each boot file of the plurality of boot files, match the read temperature and the write temperature to a corresponding boot file, where the matching includes accessing a table storing each boot file and a corresponding read temperature and a corresponding write temperature, and read the corresponding boot file.

In another embodiment, a data storage device includes memory means and a controller coupled to the memory means. The controller is configured to determine a read temperature of the memory means during a read operation to read data from the memory means, where the data includes a plurality of copies, and where each copy of the plurality of copies is programmed with either a different amount of program loop cycles (PLCs), a different amount of charged saved in saved in one or more floating gates of the memory device, a different distribution of charges corresponding to one or more cell states, or combinations thereof, and retrieve a corresponding copy based on the read temperature and a write temperature of the data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, improving reliability of boot file data during boot operations. A data storage device includes a memory device and a controller coupled to the memory device. When a boot operation of the data storage device is initiated, the controller retrieves a relevant boot file from the memory device to boot the data storage device with. The relevant boot file to be retrieved from a plurality of boot files may be determined by a write temperature corresponding to the temperature of when the boot file was programmed to the memory device and a read temperature of the boot file during the boot operation. Each boot file of the plurality of boot files is programmed using different programming parameters in order to cover a range of possible retention levels.

Figure 1:
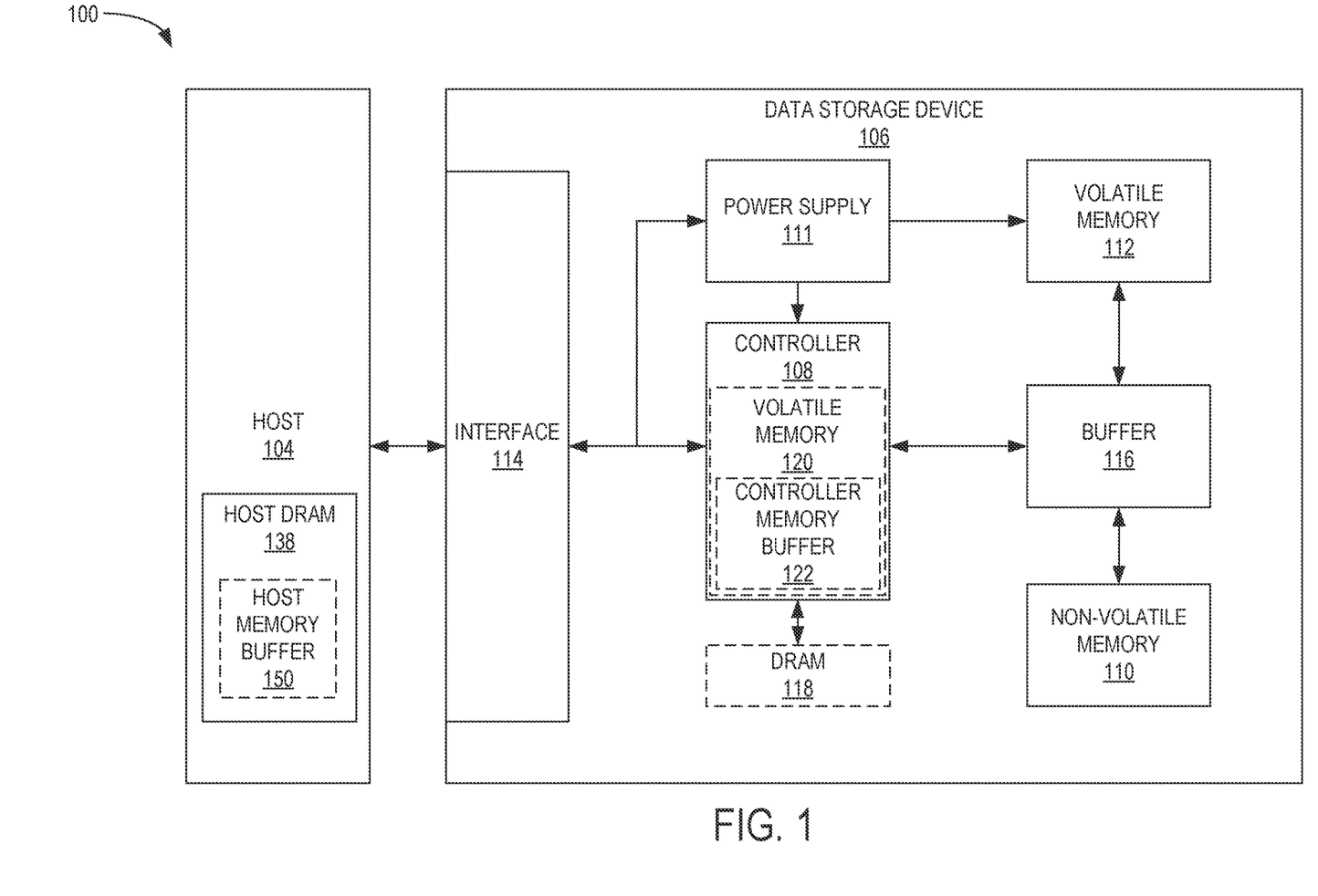
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
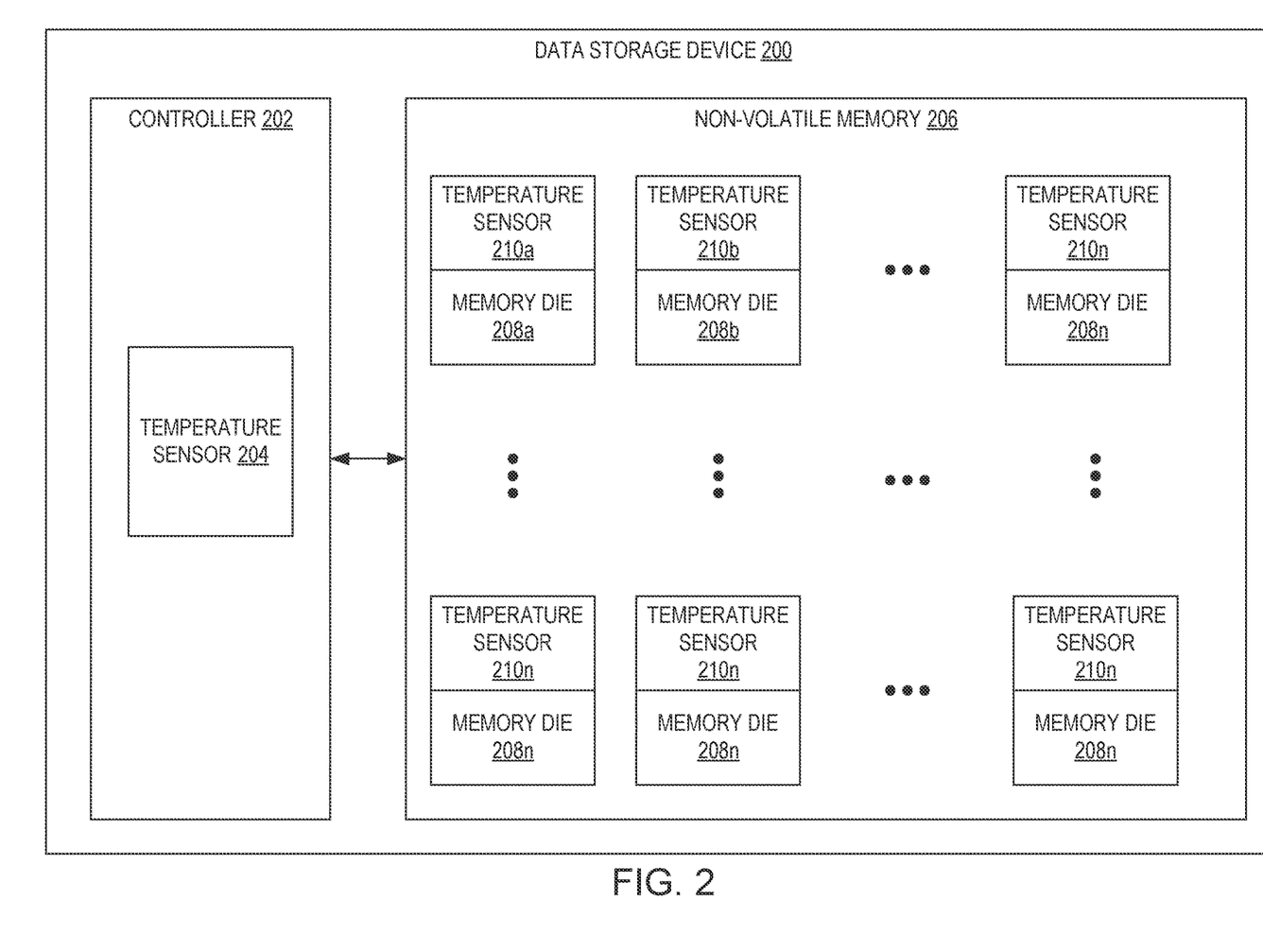
FIG. 2 is a schematic block diagram illustrating a data storage device having a plurality of temperature sensors, according to certain embodiments.

FIG. 2 is a schematic block diagram illustrating a data storage device 200 having a plurality of temperature sensors (i.e., controller temperature sensor 204 and a plurality of NVM temperature sensors 210a-210n), according to certain embodiments. The data storage device 200 may be the data storage device 106 of FIG. 1, such that the data storage device 200 may interface with the host device 104 or be networked in a server or cloud format. It is to be understood that the data storage device 200 may include additional components not shown for simplification purposes.

The data storage device 200 includes a controller 202 and an NVM 206. The controller 202 includes the controller temperature sensor 204. The NVM 206 includes the plurality of NVM temperature sensors 210a-210n and a plurality of memory dies 208a-208n, where each memory die of the plurality of memory dies 208a-208n is coupled to a respective temperature sensor of the plurality of temperature sensors 210a-210n. It is to be understood that the illustrated embodiment is not intended to be limiting, but to provide an example of a possible embodiment. For example, a temperature sensor of the NVM 206 may be coupled to two or more memory dies. Likewise, a combination of the previously described examples may be applicable to the described embodiments.

The controller temperature sensor 204 may be configured to determine an operating temperature of the data storage device 200 as well as an operating temperature of the NVM 206. Likewise, each of the plurality of NVM temperature sensors 210a-210n may be configured to determine an operating temperature of the coupled memory die of the plurality of memory dies 208a-208n. The temperatures determined by the controller temperature sensor 204 and the plurality of NVM temperature sensors 210a-210n may be provided to the controller 202.

Figure 3:
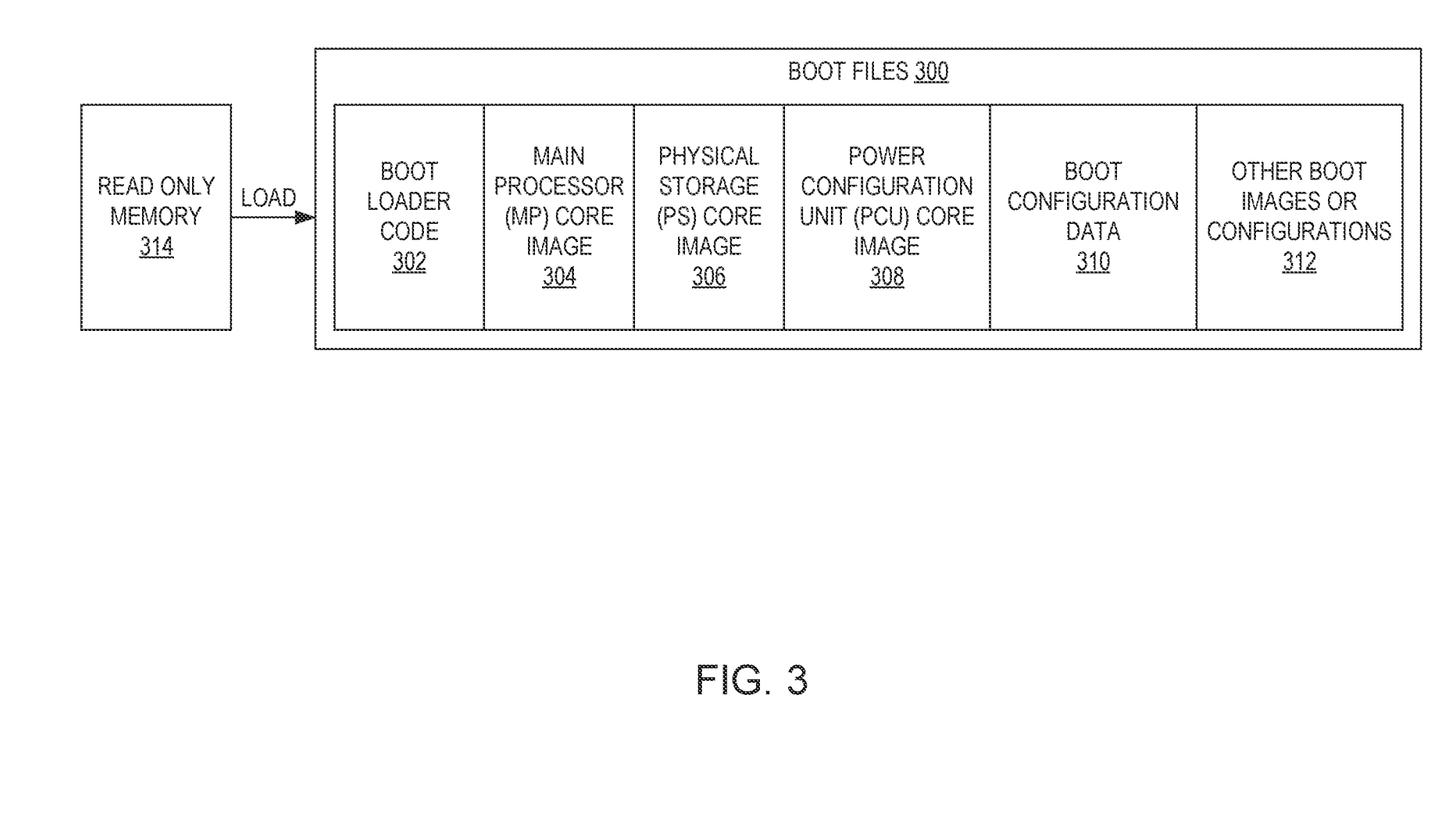
FIG. 3 is an illustration of boot images and boot configurations of a data storage device, according to certain embodiments.

FIG. 3 is an illustration of boot images and boot configurations of a data storage device, such as the data storage device 106 of FIG. 1 or the data storage device 200 of FIG. 2, according to certain embodiments. For exemplary purposes, aspects of the storage system 100 of FIG. 1 may be referenced herein.

When the data storage device 106 is booted, a read only memory (ROM) 314 of the data storage device loads boot files 300 that are needed to boot the data storage device 106. In other words, the boot files 300 may be one of a plurality of boot files, where the boot files 300 correspond to the boot operation occurring. The boot files 300 include a boot loader code 302, a main processor (MP) core image 304, a physical storage (PS) core image 306, a power configuration unit (PCU) core image 308, boot configuration data 310, and, optionally, other boot images or configurations 312. During a boot operation, the boot loader code 302 is first loaded to a basic input/output system (BIOS) in order to initiate the boot sequence. The MP core image 304 is then loaded to boot the main processor. The PS core image 306 is loaded afterwards to boot the data buffer CPU. The PCU core image 308 is then loaded to boot the power configuration unit. After the previously listed codes/core images are loaded and booted, the boot configuration data 310 is then loaded.

Because the boot files 300 include code that starts the system (e.g., the data storage device), any data corruptions in the boot files 300 may cause the system to not start properly or even cause the system to crash during the boot operation. Although the boot files 300 may include error correction data, such as error correction code (ECC), low density parity check (LDPC) code, exclusive or (XOR) data, parity data, and the like, the amount of errors accumulated may exceed the correction capabilities of the previously listed error correction methods. For example, when the data storage device 106 is booted or operating under high temperatures, the data retention capabilities of the memory device (e.g., NVM 110) may be diminished, such that additional bit flips may be accumulated.

In order to combat diminished data retention capabilities of the memory device, with respect to temperature conditions, the controller 108 may change a programming condition of the program operation to the NVM 110. For example, the controller 108 may increase a number of minimum program loop cycles (PLCs) to program the data to the NVM 110. By increasing the number of PLCs, the charge stored in a floating gate transistor of the corresponding memory cell of the NVM 110 storing the data is more precise, or, in other words, located in towards a center portion of a voltage distribution for the relevant cell state (e.g., FIG. 4A). Likewise, the controller 108 may program the data to the NVM 110 in such a way that the distribution of memory cells are more precise where less memory cells are have a charge in an intermediate level (e.g., tighter cell voltage state distributions).

Figure 4A:
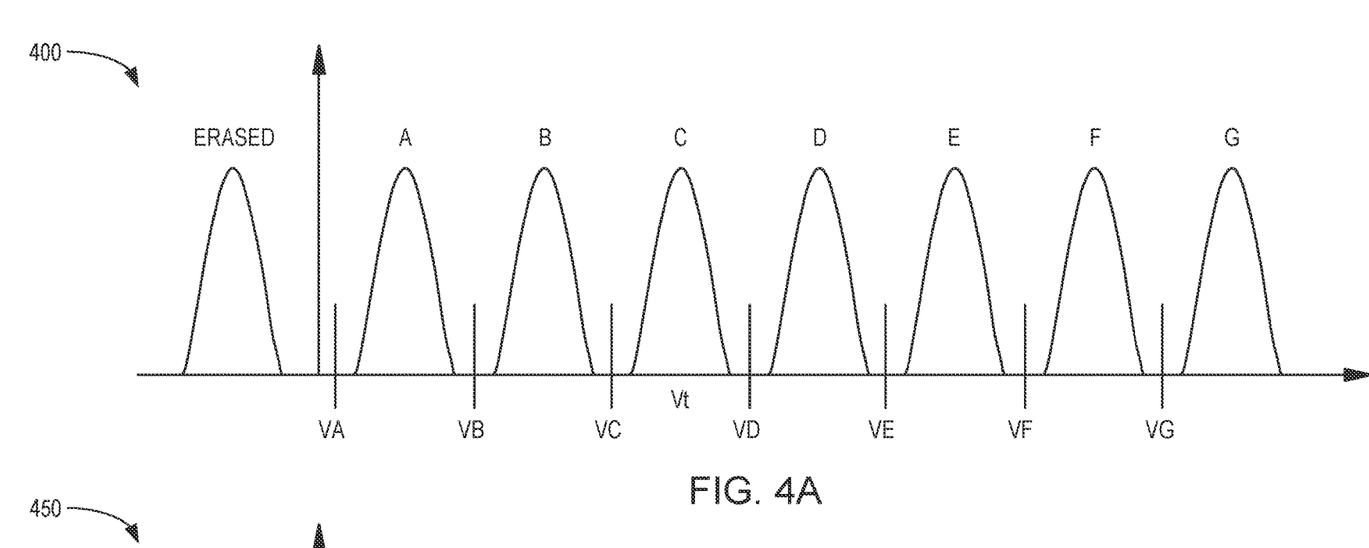
FIG. 4A is graph illustrating threshold voltages for TLC memory, according to certain embodiments.

FIG. 4A is a graph 400 illustrating threshold voltages for TLC memory, according to certain embodiments. TLC memory includes 3 bits, where each bit may have a program state of either 0 or 1. The program state refers to the state of the memory cell, whether the memory cell is empty (i.e., no data exists) or the memory cell is programmed (i.e., data exists). Furthermore, the number of unique combinations of program states can be solved in the following equation: (Total number of voltage levels)=2^(number of bits per memory cell). For the TLC memory, the number of voltage levels is eight because 2^3=8.

As the number of bits of the memory cell increases, the memory cell can record more information leading to larger data storage. Furthermore, the equation for the unique combination of program states may be applied to SLC memory, TLC memory, QLC memory, penta-layer cell (PLC) memory, and other memory densities.

The program state of 0 refers to a programmed state, whereas the program state of 1 refers to an erased state. The TLC memory has 8 voltage levels, where one is erased and seven are programmed. Furthermore, the one voltage level that is erased has a bit combination of program state 111. For any memory cell, if the bit combination only contains the program state 1, then the program state is erased (e.g., 1 for SLC, 11 for MLC, and 1111 for QLC). Listing from lowest threshold voltage, denoted by Vt on the x-axis, to highest threshold voltage in FIG. 4A, the voltage levels are 111 for the erased cell state, 110 for cell state A, 100 for cell state B, 000 for cell state C, 010 for cell state D, 011 for cell state E, 001 for cell state F, and 101 for cell state G.

The bits for the cell state (i.e., ###) are upper page, middle page, lower page. Furthermore, the lines between the curves are labeled VA, VB, VC, VD, VE, VF, and VG are related to the threshold or reference voltage. For other memory cells, the number of threshold or reference voltages can be solved by the following equation: (number of threshold or reference voltages)=(total number of voltage levels)−1. The individual pages of data can be read by performing a number of comparisons at one or more threshold points and determining whether the cell voltage is lower or higher than the threshold. Each voltage curve represents a voltage distribution for the respective cell state. It is to be understood that the cell state distribution curve is an example embodiment. It is to be further understood that a tail of the voltage curve of a cell state may overlap with a head of the voltage curve of an adjacent cell state and vice-versa.

Figure 4B:
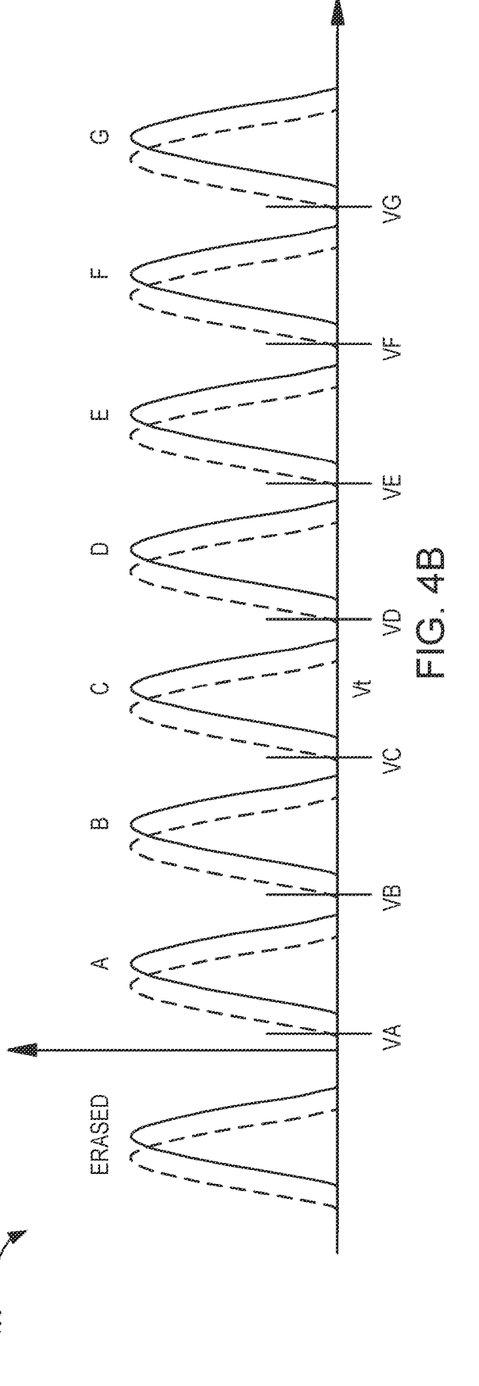
FIG. 4B is a graph illustrating threshold voltages for TLC memory with data retention shift, according to certain embodiments.

FIG. 4B is a graph 450 illustrating threshold voltages for TLC memory with data retention shift, according to certain embodiments. When the memory device, such as the NVM 110 of FIG. 1 or the NVM 206 of FIG. 2, experiences a high temperature condition, the cell voltage distribution curves, indicated by the dashed curves, may be shifted from an optimal voltage range. For example, as shown in FIG. 4A, the cell voltage distributions for each of the cell states exists between the threshold voltages for each state. However, as shown in FIG. 4B, cell voltage distribution curves are shifted in the negative voltage direction (i.e., towards 0 V). Furthermore, it is to be understood that the voltage distribution curves may be widened, such that adjacent voltage curves may overlap. Thus, when reading a certain voltage, the controller 108 may determine that the certain voltage stored in a memory cell is in the cell state B voltage even though the voltage originally stored in the memory cell corresponded with the cell state C voltage. Therefore, the controller 108 may determine that the data read from the memory cell may be erroneous (e.g., bit flip).

Figure 5:
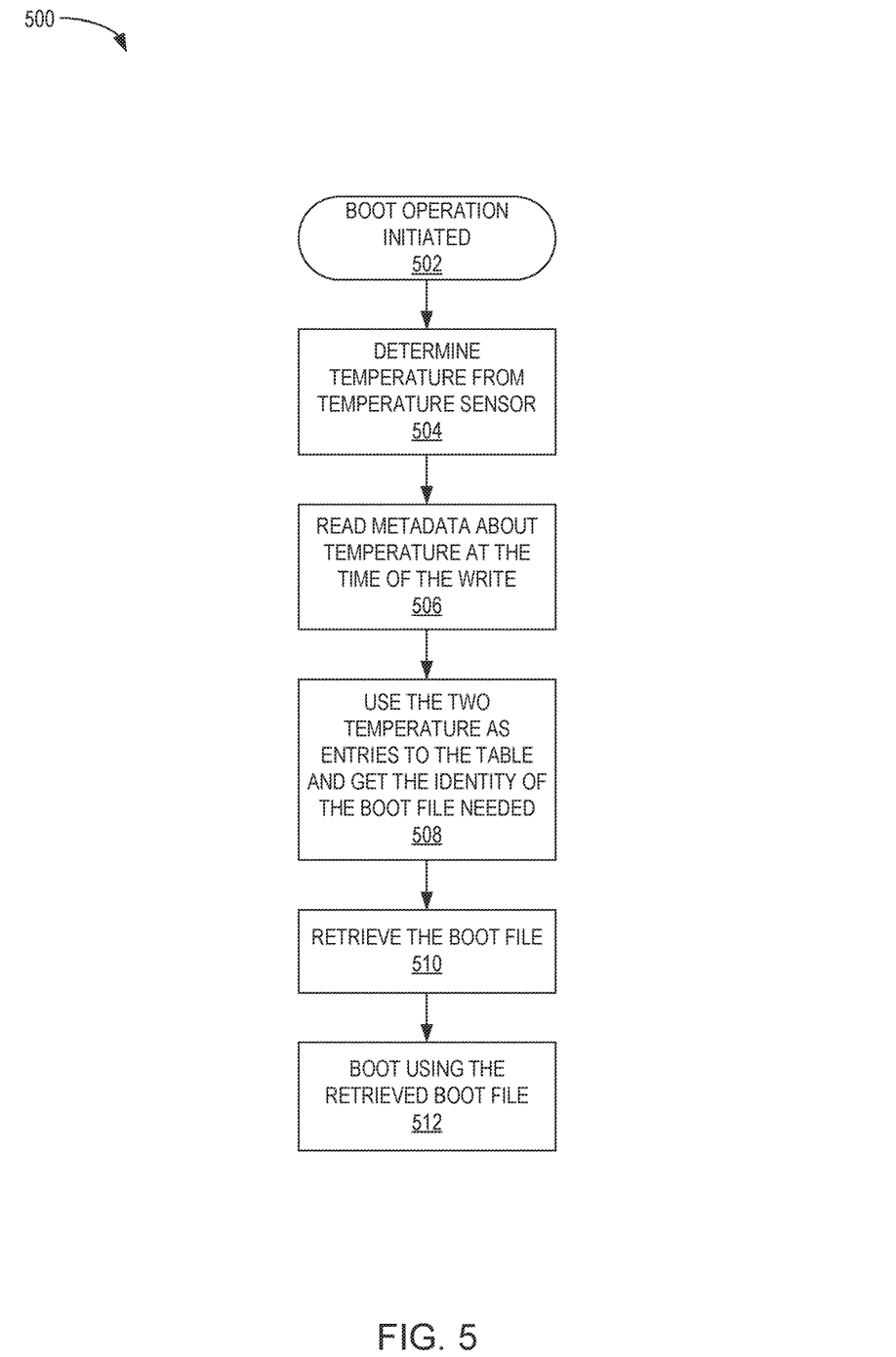
FIG. 5 is a flow diagram illustrating a method of selecting a boot file based on temperature conditions of a data storage device, according to certain embodiments.

FIG. 5 is a flow diagram illustrating a method 500 of selecting a boot file based on temperature conditions of a data storage device, such as the data storage device 200 of FIG. 2, according to certain embodiments. For exemplary purposes, aspects of the computing system 100 of FIG. 1 or the data storage device 200 of FIG. 2 may be referenced herein.

At block 502, the boot operation is initiated. At block 504, the controller 202 determines a temperature of the data storage device 200 or the NVM 206 using the controller temperature sensor 204. In some examples, the controller 202 may receive a temperature of the relevant memory dies storing a plurality of copies of the boot file, where each copy of the boot file is programmed differently based on a data retention level needed. For example, by increasing a number of PLCs, the data retention may be increased. Likewise, by causing the charge to be more precisely stored in the memory cell (i.e., towards a center of a cell state voltage distribution), the data retention may be increased. Furthermore, by programming the memory cells so that less memory cells are in intermediate level, the data retention level may be increased.

At block 506, the controller 108 reads metadata about the write temperature of the plurality of the copies of the boot file at the time the boot files were programmed to the NVM 206. The metadata may be stored in a header of each of the boot files. The write temperature may be stored in the header during the programming of the boot files to the NVM 206.

At block 508, the controller 108 utilizes the temperature determined at block 504 (e.g., read temperature) and the write temperature read from the header of the plurality of boot files as entries in a table in order to determine the identity of the boot file needed for the boot operation. The identity of the boot file needed may be dependent on the read and write temperature conditions and the corresponding boot file is programmed to the NVM 206 using programming methods that may increase the data retention of the data programmed based on the temperature conditions. Table 1 below is an exemplary illustration of table storing the temperature conditions and the corresponding boot file pointer.

TABLE 1

| Write Temperature | Read Temperature | Boot File Pointer |
| --- | --- | --- |
| Low | Low | Boot File 1 |
| Low | High | Boot File 2 |
| High | Low | Boot File 3 |
| High | High | Boot File 4 |

Referring to Table 1, the terms "low" and "high" may refer to various temperature ranges applicable to the described embodiments. It is to be understood that there may be additional temperature ranges (e.g., "mid") applicable to the described embodiments and are contemplated to be usable with the described embodiments. Furthermore, each of the boot files (boot file 1, boot file 2, boot file 3, and boot file 4) are the same boot file, but programmed differently based on a data retention level needed. The write temperature may be the temperature of the boot file collected during simulations or tests of write boot files. Likewise, the read temperature is associated with the temperature at which the boot files are read at during data storage device operation.

In some examples, the boot files may be programmed using a program count consideration, such that the programming may account for the number of times that the certain memory cells have been programmed to. It is further contemplated, that Table 1 may be expanded so that a fourth column storing read threshold information may be included. Because read thresholds may be adjusted over time through different methods, such as valley search, including the read thresholds for a particular boot file may improve decoding operations and lead to an improved operation of the data storage device. In one example, boot file 2 may have one or more additional PLCs than boot file 1, boot file 3 may have one or more additional PLCs than boot file 2, and boot file 4 may have one or more additional PLCs than boot file 3.

At block 510, the relevant boot file determined using the table (e.g., Table 1) is retrieved from the NVM 206. At block 512, the controller 202 utilizes the retrieved boot file for the boot operation. Because the retrieved boot file is optimized for the boot operation operating conditions (i.e., data retention), the boot operation may be improved.

It is to be understood that the described embodiments may be applicable to general programming operations, in order to further protect the data against temperature conditions outside of normal operating temperature conditions.

By covering a range of several possible data retention levels using different programming operations, data retention of a data storage device may be improved in cases of high operating temperatures.

In one embodiment, a data storage device includes a memory device and a controller coupled to the memory device. The controller is configured to determine that a boot operation of the data storage device is occurring, retrieve a boot file from the memory device, and boot the data storage device using the retrieved boot filed. A plurality of boot files are stored in the memory device. Each of the plurality of boot files corresponds with a different data retention level. Retrieving the boot file includes determining a data retention level based on environment conditions of the memory device during the boot operation and selecting the boot file of the plurality of boot files based on the determining.

A first boot file of the plurality of boot files is associated with a first number of program loop cycles (PLCs) and a second boot file of the plurality of boot files is associated with a second number of PLCs. The first number of PLCs is different than the second number of PLCs. The first number of PLCs is greater than the second number of PLCs. The first boot file is associated with a higher data retention level than the second boot file. A first boot file of the plurality of boot files is associated with a first amount of charge saved in one or more floating gates of the memory device and a second boot file of the plurality of boot files is associated with a second amount of charge saved in another one or more floating gates of a corresponding memory cell of the memory device. The first amount of charge is different than the second amount of charge. The first amount of charge is more precise than the second amount of charge. The first boot file is associated with a higher data retention level than the second boot file. A first boot file of the plurality of boot files is associated with a plurality of cell states having a first distribution of charges and a second boot file of the plurality of boot files is associated with a plurality of cell states having a second distribution of charges. The first distribution of charges is different than the second distribution of charges. The first distribution of charges is shifted tighter than the second distribution of charges. The first boot file is associated with a higher data retention level than the second boot file. Determining the data retention level based on the environment conditions of the memory device during the boot operation includes determining a read temperature of the memory device during the boot operation and matching the read temperature with a write temperature. The write temperature is a temperature of the boot file when the boot file was programmed to the memory device. The write temperature is stored in a header of the boot file. Selecting the boot file of the plurality of boot files based on the determining includes accessing a table storing the write temperature, the read temperature, and a boot file pointer for each of the plurality of boot files. The write temperature and the read temperature corresponds with a range of temperatures. The environment conditions includes a read count for each boot file of the plurality of boot files.

In another embodiment, a data storage device includes a memory device and a controller coupled to the memory device. The controller is configured to initiate a boot operation, determine a read temperature of a plurality of boot files, read metadata from the plurality of boot files, where the metadata includes a write temperature corresponding to each boot file of the plurality of boot files, match the read temperature and the write temperature to a corresponding boot file, where the matching includes accessing a table storing each boot file and a corresponding read temperature and a corresponding write temperature, and read the corresponding boot file.

The data storage device further includes a plurality of temperature sensors configured to read a temperature of the controller and one or more dies of the memory device. The write temperature is a temperature of the memory device while programming each boot file of the plurality of boot files to the memory device. The table further includes a read threshold for each boot file of the plurality of boot files. The read threshold corresponds to a corresponding one or more cell states. Each boot file of the plurality of boot files corresponds with a different data retention level, and wherein each boot file of the plurality of boot files differ in an amount of program loop cycles (PLCs), an amount of charged saved in saved in one or more floating gates of the memory device, and a distribution of charges corresponding to one or more cell states.

In another embodiment, a data storage device includes memory means and a controller coupled to the memory means. The controller is configured to determine a read temperature of the memory means during a read operation to read data from the memory means, where the data includes a plurality of copies, and where each copy of the plurality of copies is programmed with either a different amount of program loop cycles (PLCs), a different amount of charged saved in saved in one or more floating gates of the memory device, a different distribution of charges corresponding to one or more cell states, or combinations thereof, and retrieve a corresponding copy based on the read temperature and a write temperature of the data.

The data is a boot file. The write temperature is stored in a header of the data stored in the memory means.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
      determine that a boot operation of the data storage device is occurring;
      retrieve a boot file from the memory device, wherein:
         a plurality of boot files are stored in the memory device;
         each of the plurality of boot files corresponds with a different data retention level; and
         retrieving the boot file comprises:
            determining a data retention level based on environment conditions of the memory device during the boot operation; and
            selecting the boot file of the plurality of boot files based on the determining; and
      boot the data storage device using the retrieved boot file.

2. The data storage device of claim 1, wherein a first boot file of the plurality of boot files is associated with a first number of program loop cycles (PLCs) and a second boot file of the plurality of boot files is associated with a second number of PLCs, and wherein the first number of PLCs is different than the second number of PLCs.

3. The data storage device of claim 2, wherein the first number of PLCs is greater than the second number of PLCs, and wherein the first boot file is associated with a higher data retention level than the second boot file.

4. The data storage device of claim 1, wherein a first boot file of the plurality of boot files is associated with a first amount of charge saved in one or more floating gates of the memory device and a second boot file of the plurality of boot files is associated with a second amount of charge saved in another one or more floating gates of a corresponding memory cell of the memory device, and wherein the first amount of charge is different than the second amount of charge.

5. The data storage device of claim 4, wherein the first amount of charge is more precise than the second amount of charge, and wherein the first boot file is associated with a higher data retention level than the second boot file.

6. The data storage device of claim 1, wherein a first boot file of the plurality of boot files is associated with a plurality of cell states having a first distribution of charges and a second boot file of the plurality of boot files is associated with a plurality of cell states having a second distribution of charges, and wherein the first distribution of charges is different than the second distribution of charges.

7. The data storage device of claim 6, wherein the first distribution of charges is shifted tighter than the second distribution of charges, and wherein the first boot file is associated with a higher data retention level than the second boot file.

8. The data storage device of claim 1, wherein determining the data retention level based on the environment conditions of the memory device during the boot operation comprises:
   determining a read temperature of the memory device during the boot operation; and
   matching the read temperature with a write temperature, wherein the write temperature is a temperature of the boot file when the boot file was programmed to the memory device.

9. The data storage device of claim 8, wherein the write temperature is stored in a header of the boot file.

10. The data storage device of claim 8, wherein selecting the boot file of the plurality of boot files based on the determining comprises:
    accessing a table storing the write temperature, the read temperature, and a boot file pointer for each of the plurality of boot files.

11. The data storage device of claim 10, wherein the write temperature and the read temperature corresponds with a range of temperatures.

12. The data storage device of claim 1, wherein the environment conditions comprises a read count for each boot file of the plurality of boot files.

13. A data storage device, comprising:
a memory device; and
a controller coupled to the memory device, wherein the controller is configured to:
initiate a boot operation;
determine a read temperature of a plurality of boot files;
read metadata from the plurality of boot files, wherein the metadata comprises a write temperature corresponding to each boot file of the plurality of boot files, wherein the write temperature is a temperature of when of a boot file was programmed to the memory device;
match the read temperature and the write temperature to a corresponding boot file, wherein the matching comprises accessing a table storing each boot file and a corresponding read temperature and a corresponding write temperature; and
read the corresponding boot file.

14. The data storage device of claim 13, further comprising a plurality of temperature sensors configured to read a temperature of the controller and one or more dies of the memory device.

15. The data storage device of claim 13, wherein the write temperature is a temperature of the memory device while programming each boot file of the plurality of boot files to the memory device.

16. The data storage device of claim 13, wherein the table further comprises a read threshold for each boot file of the plurality of boot files, wherein the read threshold corresponds to a corresponding one or more cell states.

17. The data storage device of claim 13, wherein each boot file of the plurality of boot files corresponds with a different data retention level, and wherein each boot file of the plurality of boot files differ in:
an amount of program loop cycles (PLCs);
an amount of charged saved in saved in one or more floating gates of the memory device; and
a distribution of charges corresponding to one or more cell states.

18. A data storage device, comprising:
memory means; and
a controller coupled to the memory means, wherein the controller is configured to:
determine a read temperature of the memory means during a read operation to read data from the memory means, wherein the data comprises a plurality of copies, and wherein each copy of the plurality of copies is programmed with either:
a different amount of program loop cycles (PLCs);
a different amount of charges saved in one or more floating gates of the memory means;
a different distribution of charges corresponding to one or more cell states; or
combinations thereof; and
retrieve a corresponding copy based on the read temperature and a write temperature of the data, wherein the write temperature is a temperature of when the data was programmed to the memory means.

19. The data storage device of claim 18, wherein the data is a boot file.

20. The data storage device of claim 18, wherein the write temperature is stored in a header of the data stored in the memory means.

* * * * *